United States Patent [19]
Nishitani

[11] Patent Number: 5,515,448
[45] Date of Patent: May 7, 1996

[54] DISTANCE MEASURING APPARATUS OF A TARGET TRACKING TYPE

[75] Inventor: Katsuo Nishitani, Shizuoka, Japan

[73] Assignee: Yazaki Corporation, Tokyo, Japan

[21] Appl. No.: 96,907

[22] Filed: Jul. 26, 1993

[30] Foreign Application Priority Data

Jul. 28, 1992 [JP] Japan .................................. 4-201150
Jul. 28, 1992 [JP] Japan .................................. 4-201151

[51] Int. Cl.$^6$ ............................ G06K 9/00; H04N 7/18; B60Q 1/00; G08G 1/16
[52] U.S. Cl. ..................... 382/106; 382/104; 382/107; 348/140; 340/435; 340/436; 340/903
[58] Field of Search ............................. 382/1, 104, 106, 382/107, 103; 348/140, 148, 170; 340/435, 436, 903; 364/424.02; 356/4; 318/587; 180/167

[56] References Cited

U.S. PATENT DOCUMENTS

| | | | |
|---|---|---|---|
| 5,139,327 | 8/1992 | Tanaka | 348/170 |
| 5,165,108 | 11/1992 | Asayama | 340/436 |
| 5,243,418 | 9/1993 | Kuno et al. | 348/170 |
| 5,253,050 | 10/1993 | Karasudani | 348/140 |
| 5,304,980 | 4/1994 | Maekawa | 348/170 |
| 5,307,136 | 4/1994 | Saneyoshi | 348/140 |
| 5,309,137 | 5/1994 | Kajiwara | 340/436 |

FOREIGN PATENT DOCUMENTS 2-241855  9/1990  Japan.
3-170012  7/1991  Japan.

*Primary Examiner*—Jose L. Couso
*Assistant Examiner*—Matthew C. Bella
*Attorney, Agent, or Firm*—Finnegan, Henderson, Farabow, Garrett & Dunner

[57] ABSTRACT

A distance measuring apparatus of the target tracking type which reduces the amount of data to be processed to allow high rate processing on the real time basis so that a distance to a moving object such as an automobile can be measured while tracking the object. The distance measuring apparatus comprises a plurality of frame memories for storing quantized density data of an image for one frame obtained at a fixed interval of time by imaging a travelling road in a matrix of columns and rows. The quantized data is compared at the same coordinate points to produce density difference data. The density difference data is accumulated for the individual columns and rows in the direction of each column and row, respectively. A preceding vehicle is tracked in accordance with the accumulated column data, the distance to the vehicle in front is measured in accordance with the accumulated row data. A rear-end collision preventing alarming apparatus incorporates the distance measuring apparatus and sets off an alarm to warn of a possible collision between the vehicles.

6 Claims, 10 Drawing Sheets

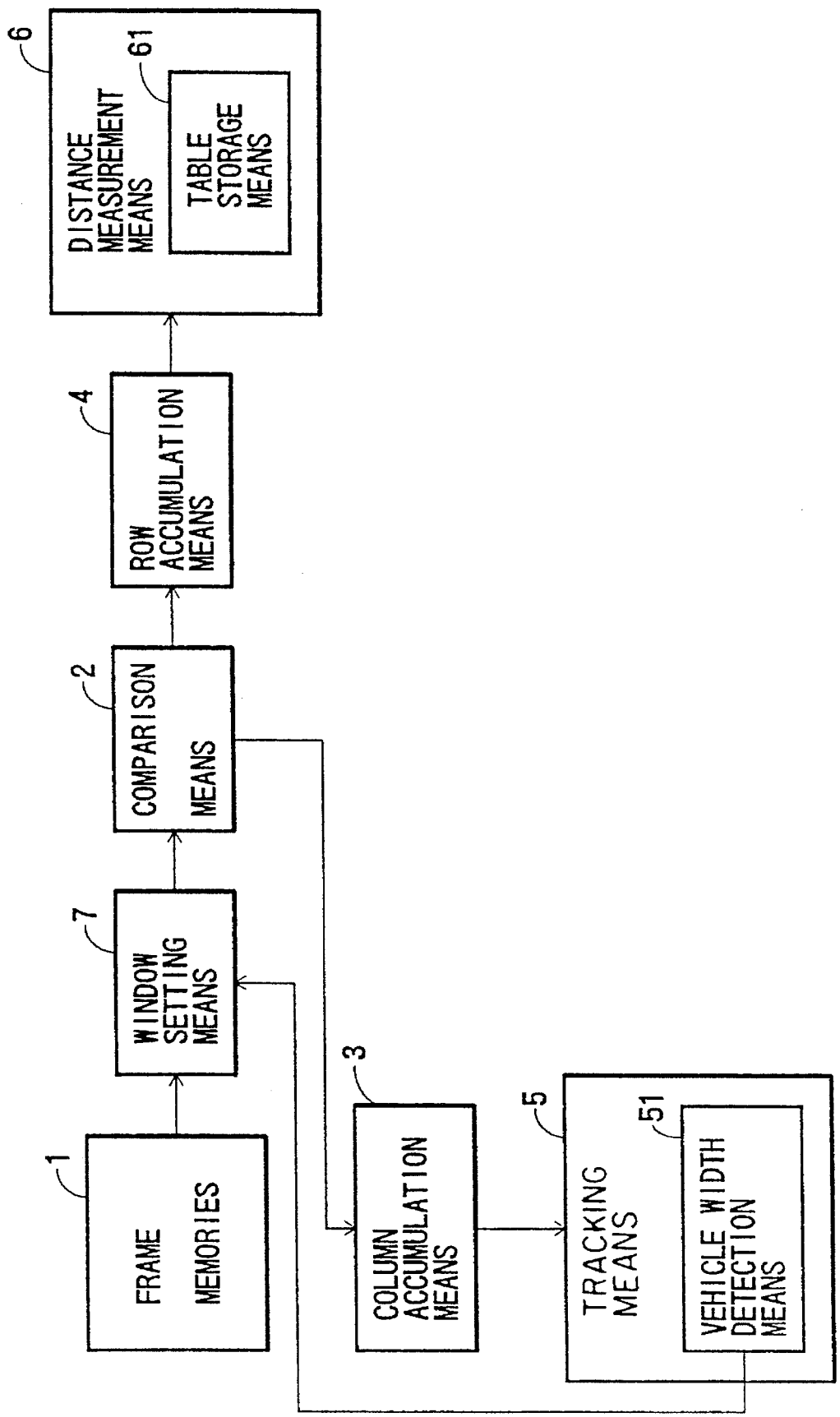

FIG. 2a
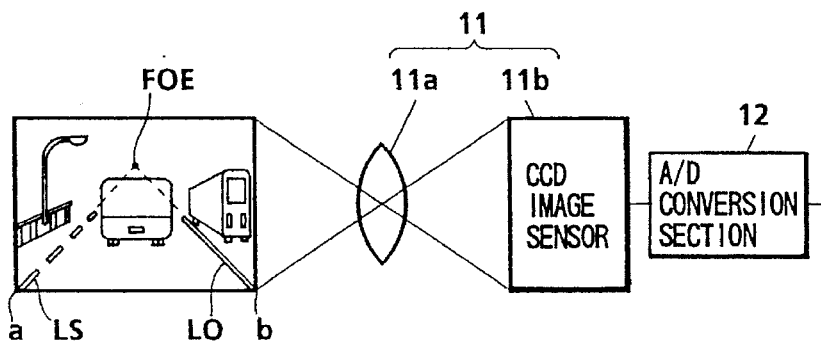
FIG. 2b
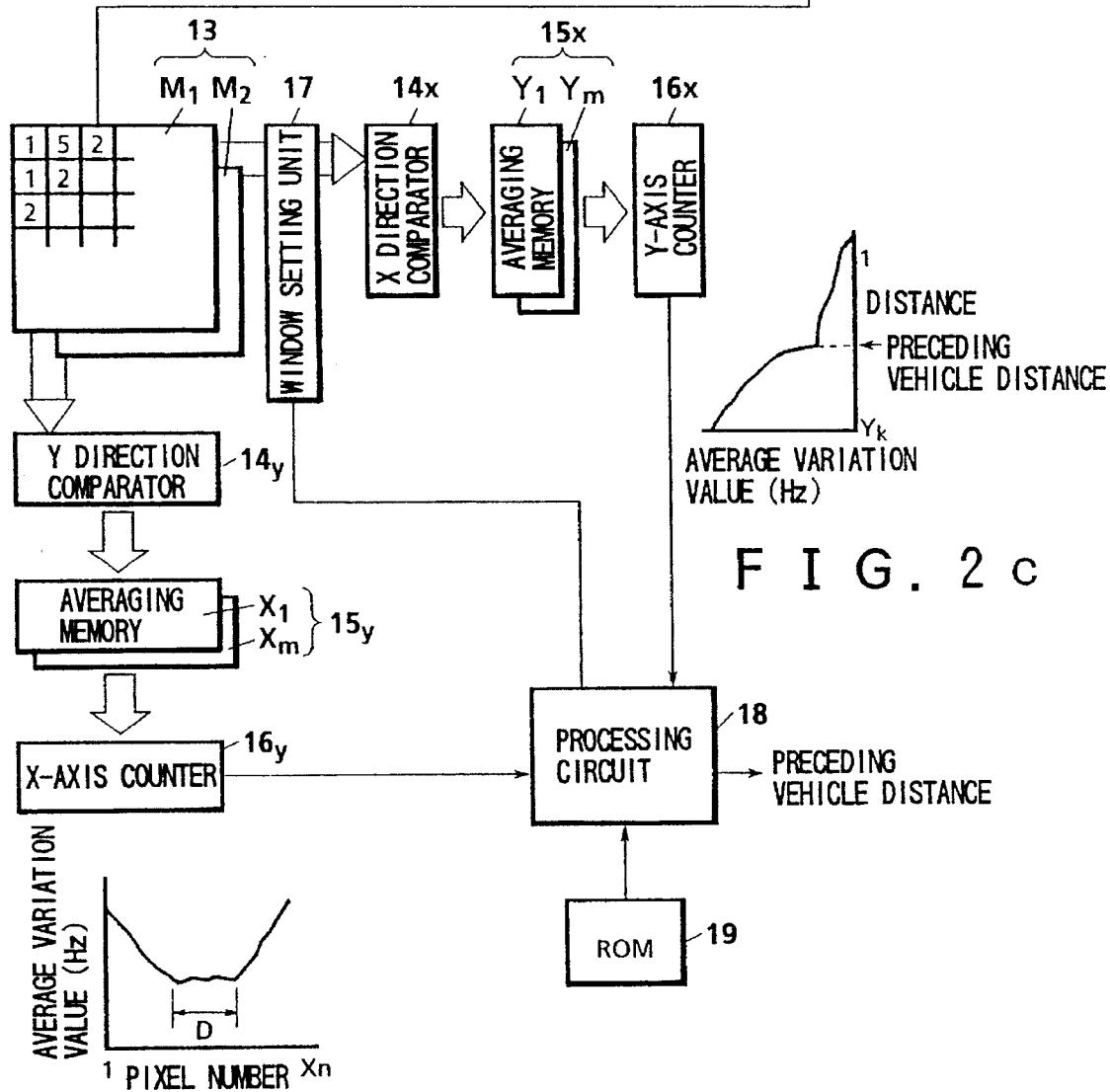
FIG. 2c

|   | 0 | 1 | 2 | 3 | | 254 | 255 |
|---|---|---|---|---|---|---|---|
| 0 | 1 | 5 | 2 | 4 | | 3 | 5 | 4 |
| 1 | 1 | 2 | 3 | | | 4 | 3 | 3 |
| 2 | 2 | 5 | | | | | 2 | 4 |
| 3 | 4 | | | | | | | |
| 253 | 5 | | | | | | | 5 |
| 254 | 8 | 5 | | | | | 7 | 6 |
| 255 | 8 | 7 | 6 | | | 6 | 4 | 3 |

FIG. 11a
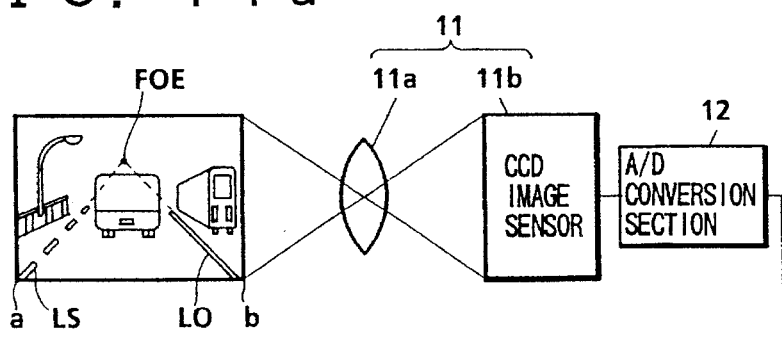
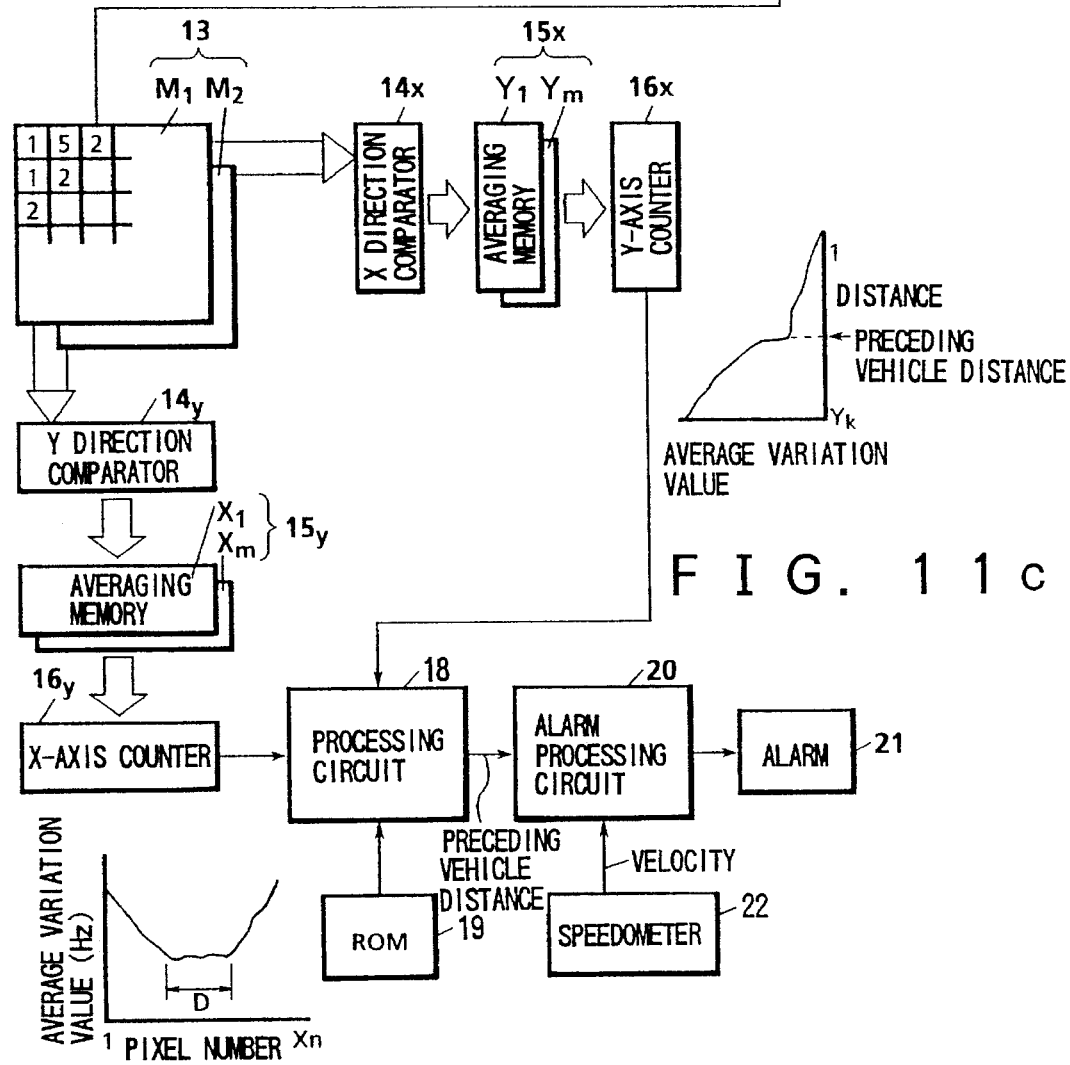
FIG. 11c
FIG. 11b

F I G. 1 2
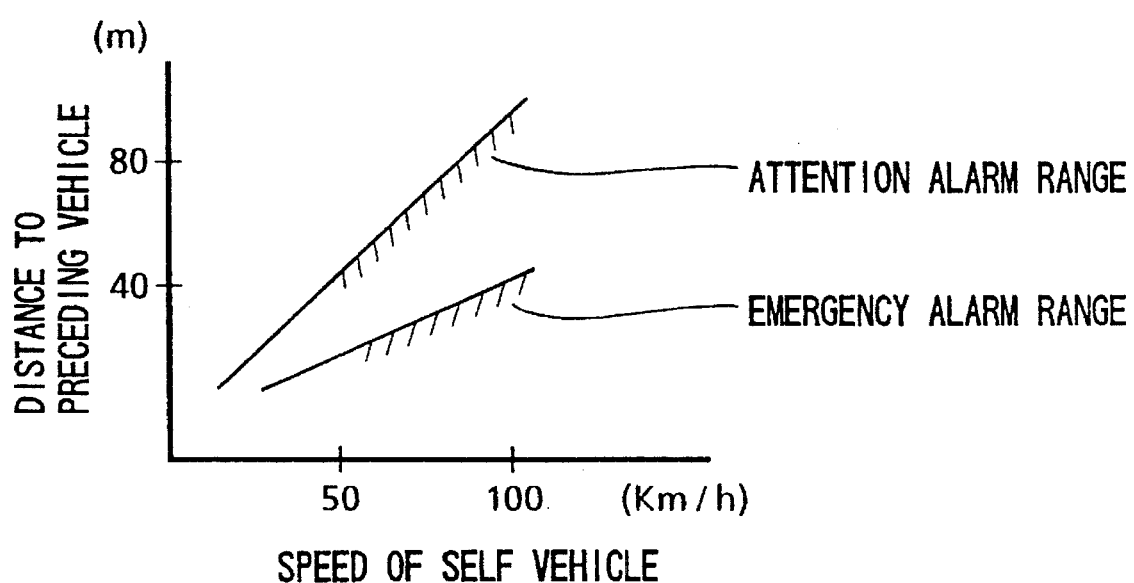

DISTANCE MEASURING APPARATUS OF A TARGET TRACKING TYPE

BACKGROUND OF THE INVENTION

1. Field of the Invention

This invention relates to a distance measuring apparatus of the target tracking type, and more particularly to a distance measuring apparatus which measures the distance to a moving object such as an automobile while tracking the moving object. The invention further relates to a rear-end collision preventing apparatus incorporating the distance measuring apparatus and an alarm for preventing a rear-end collision between objects such as an automobile following another automobile.

2. Description of Related Art

Various methods of identifying an object in front of a moving vehicle have been proposed. For example, Japanese Patent Laid-Open Application No. Heisei 2-241855 discloses an image identifying method based on an optical flow system. Japanese Patent Laid-Open Application No. Heisei 3-170012 discloses a data matching method based on window processing.

The conventional methods, however, require successively comparing picture elements and consequently require processing of a very large amount of data of about 1 to 10 megabytes. Accordingly, an identifying apparatus which incorporates the conventional methods have not been put into practical use in vehicles which require a high rate of image processing.

SUMMARY OF THE INVENTION

It is an object of the present invention to provide a distance measuring apparatus of the target tracking type which reduces the amount of data to be processed to allow for a high rate of processing on a real time basis so that a distance to a moving object such as an automobile can be measured while tracking the object.

It is another object of the present invention to provide a rear-end collision preventing alarming apparatus which reduces the amount of data to be processed to allow for a high rate processing on a real time basis and includes an alarm for preventing a rear-end collision with a moving object such as an automobile while tracking the object.

In order to attain the objects described above, according to an aspect of the present invention, there is provided a distance measuring apparatus of the target tracking type, which comprises a plurality of frame memories for receiving quantized density data of an image in successive frames obtained at fixed intervals of time by imaging a travelling road along which a vehicle incorporating the distance measuring apparatus is travelling and for selectively storing the received density quantized data in columns and rows in the frame memories. A comparison means compares the quantized data stored in the frame memories at the same coordinate points and calculates the differences to produce density difference data. A column accumulation means accumulates the density difference data obtained from the comparison means for the individual columns in the direction of each column. A row accumulation means accumulates the density difference data obtained from the comparison means for the individual rows in the direction of each row. A tracking means tracks a vehicle that is in front of the vehicle that incorporates the distance measuring apparatus, in accordance with an output of the column accumulation means. And a distance measurement means measures the distance between the two vehicles in accordance with an output of the row accumulation means.

In the distance measuring apparatus, quantized density data of an image for one frame obtained at each fixed interval of time are stored in columns and rows in the frame memories, and the quantized data at the same coordinate points stored in the frame memories are compared with each other to obtain differences to produce density difference data. The density difference data are accumulated for the individual columns in the direction of each column and also for the individual rows in the direction of each row. Then, the vehicle in front of a vehicle incorporating the distance measuring apparatus is tracked in accordance with the accumulated values for the columns while the distance between the two vehicles is measured in accordance with the accumulated values for the rows. Accordingly, the distance measuring apparatus can track the vehicle in front and measure the distance to the vehicle in front without employing a memory having a large capacity.

Preferably, the tracking means includes vehicle width detection means for detecting, as the width of the vehicle in front a range over which the accumulated values output by the column accumulation means are steady and at a minimum. The distance measuring apparatus may further comprise window setting means for setting, in accordance with the width of the preceding vehicle detected by the vehicle width detection means, a window which indicates a range of those quantized data which are to be compared by the comparison means. Since the width is detected using the range over which the accumulated values for the individual columns in the direction of each column are steady and at a minimum, and a window for showing a range of quantized data to be compared is set in response to the width of the vehicle thus detected, processing of those quantized data which are unnecessary for processing can be omitted, allowing for a higher rate of processing and a reduction of noise components.

The distance measurement means may include table storage means for storing a table of data indicative of distance values corresponding to different values of the output of the row accumulation means, and means for measuring the distance to the vehicle in front with reference to the data table in accordance with a position at which the accumulated values outputted from the row accumulation means exhibit a sudden variation.

According to another aspect of the present invention, there is provided a rear-end collision preventing alarming apparatus for a vehicle, which includes the elements of the distance measuring apparatus described above and velocity measurement means for measuring a velocity of the vehicle incorporating the distance measuring device, an alarming determination means for determining, based on the measured distance and the measured velocity whether or not an alarm for preventing a rear-end collision should be set off, and an alarming means for generating an alarm in response to a determination that the alarm should be set off.

Accordingly, the amount of data to be processed is reduced so that a high rate of processing on a real basis is allowed, and consequently, when the vehicle incorporating the preventing alarm approaches a vehicle suddenly due to the distance between the vehicles and the velocity of the vehicle, an alarm for prevention of a rear-end collision can be set off immediately to give a warning of a rear-end collision to the driver of the vehicle.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is a block diagram showing the basic construction of a distance measuring apparatus of the target tracking type according to the present invention:

FIG. 2a is a diagrammatic view of a distance measuring apparatus of the target tracking type showing a preferred embodiment of the present invention, and FIGS. 2b and 2c are diagrams illustrating different operations of a processing circuit of the distance measuring apparatus;

FIG. 3 is a diagram showing a detailed construction of a frame memory of the distance measuring apparatus of FIG. 2a;

FIG. 4 is a diagrammatic view illustrating operation of a comparator of the distance measuring apparatus of FIG. 2a;

FIG. 5 is a diagrammatic view illustrating operation of an averaging memory of the distance measuring apparatus of FIG. 2a;

FIG. 6 is a diagram illustrating operation of a counter of the distance measuring apparatus of FIG. 2a;

FIG. 7 is a diagrammatic view illustrating the principle of detection of a width of a vehicle by a processing circuit of the distance measuring apparatus of FIG. 2a;

FIG. 8 is a diagrammatic view illustrating the principle of measurement of the distance to a preceding vehicle by the processing circuit of the distance measuring apparatus of FIG. 2a;

FIG. 11a is a diagrammatic view of a rear-end collision preventing alarming apparatus showing a second preferred embodiment of the present invention, and FIGS. 11b and 11c are diagrams illustrating different operations of a processing circuit of the rear-end collision preventing alarming apparatus; and FIG. 12 is a diagram illustrating the principle of determination of an alarm by an alarming processing circuit of the rear-end collision preventing alarming apparatus of FIG. 11a.

DESCRIPTION OF THE PREFERRED EMBODIMENTS

Figures 3, 5:
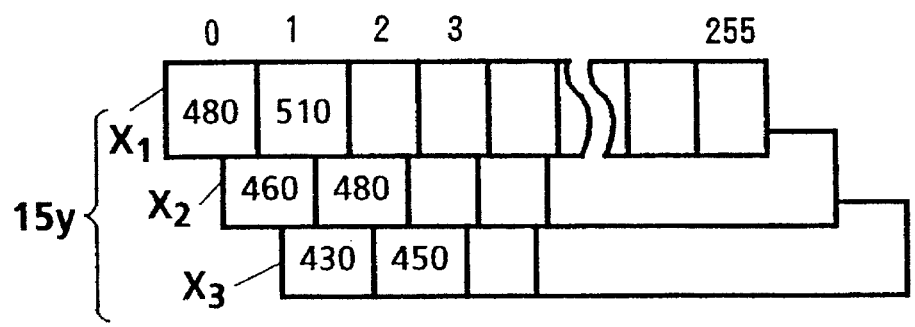

Referring first to FIG. 1, there is shown the basic construction of a distance measuring apparatus of the target tracking type according to the present invention. The distance measuring apparatus comprises a plurality of frame memories 1 for receiving quantized density data of an image in successive frames obtained at fixed intervals of time by imaging a travelling road along which a vehicle incorporating the distance measuring apparatus is travelling and for selectively storing the received density quantized data in columns and rows in the frame memories. Comparison means 2 compares the quantized data stored in the frame memories 1 at the same coordinate points and calculates the differences to produce density difference data. Column accumulation means 3 accumulates the density difference data obtained from the comparison means 2 for the individual columns in the direction of each column. Row accumulation means 4 accumulates the density difference data obtained from the comparison means for the individual rows in the direction of each row. Tracking means 5 tracking a vehicle that is in front of the vehicle incorporating the distance measuring apparatus, in accordance with an output of the column accumulation means 3. Distance measurement means 6 measures the distance between the vehicles in accordance with an output of the row accumulation means.

The tracking means 5 includes vehicle width detection means 51 for detecting, as the width of the vehicle in front, a range over which the accumulated values output from the column accumulation means 3 are steady and at a minimum.

The distance measuring apparatus further comprises window setting means 7 for setting, in accordance with the detected width of the vehicle in front, a window which indicates a range of those quantized data which are to be compared by the comparison means 2.

The distance measurement means 6 includes table storage means 61 for storing a table of data indicative of distance values corresponding to different values of the output of the row accumulation means 4, and measuring the distance to the vehicle in front with reference to the data table of the table storage means 61 in accordance with a position at which the accumulated values output from the row accumulation means 4 exhibit a sudden variation.

In the distance measuring apparatus described above, quantized density data of an image for one frame obtained at each fixed interval of time are stored in columns and rows in the frame memories 1, and the comparison means 2 compares the quantized data at the same coordinate points stored in the frame memories 1 with each other to obtain differences to produce density difference data. The column accumulation means 3 accumulates the density difference data obtained from the comparison means 2 for the individual columns in the direction of each column while the row accumulation means 4 accumulates the density difference data obtained from the comparison means 2 for the individual rows in the direction of each row.

The magnitudes of the accumulated values obtained from the column accumulation means 3 reflect the presence or absence of a variation between the images. Since the variations and the magnitudes of the accumulated values in a region corresponding to the vehicle in front which has a comparatively low relative velocity, the tracking means 5 can track the vehicle in front in accordance with the output of the column accumulation means 3.

On the other hand, since the accumulated values of the row accumulation means 4 exhibit a great variation at a portion corresponding to the vehicle in front which has a comparatively low relative velocity and does not present a great variation in position thereof on the screen, where the memory addresses and the distances on the frame memories are set in advance, the distance to the vehicle in front can be measured by the distance measurement means 6 which detects, from the outputs of the row accumulating means 4, the position at which such a sudden variation of the accumulated values is exhibited.

Accordingly, the distance measuring apparatus can track the front vehicle and measure the distance to the front vehicle without requiring a large capacity memory.

Further, since the vehicle width detection means 51 of the tracking means 5 detects as a width of the front of the vehicle a range within which the accumulated values of the columns which are output of the column accumulation means 3 are steady and at a minimum. The window setting means 7 sets, in response to the vehicle width detected by the vehicle width detection means 51, a window for showing a range of quantized data to be compared by the comparison means 2, and those quantized data which are unnecessary for processing can be omitted, which allows processing to be performed at a higher rate and also reduces the noise components.

The table storage means 61 of the distance measurement means 6 has the table of data indicative of the distances corresponding to the output of the row accumulation means 4 stored in advance therein, and the distance measurement means 6 measures the distance to the vehicle in front with reference to the data table of the table storage means 61 in response to the position at which the accumulated values for the rows in the direction of each row output from the row accumulation means 4 exhibit a sudden variation.

Referring now to FIG. 2a, there is shown a distance measuring apparatus of the target tracking type according to a preferred embodiment of the present invention. The distance measuring apparatus shown includes a CCD (charge coupled device) camera 11 including an optical system 11a and a CCD image sensor 11b for serving as the imaging means, and images or picks up an image of a travelling road in front of a vehicle incorporating the distance measuring apparatus, and outputs a corresponding analog image signal. An analog to digital (A/D) conversion section 12 receives the analog image signal from the CCD camera 11 and converts the image signal into a digital signal to obtain quantized data at an output thereof. A storage apparatus 13 includes a pair of frame memories $M_1$ and $M_2$ of the same construction and constituting the plurality of frame memories 1 of FIG. 1. The frame memories $M_1$ and $M_2$ alternately store quantized density value data for one frame outputted from the analog to digital conversion section 12.

The imaging conditions of the CCD camera 11 are set such that, when the input image is as shown in FIG. 2a, for example, a side line LS and a center line LO which define the lane of the self vehicle coincide with the points a and b, respectively, on the bottom line of the input image and the distance from the vehicle to the points a and b is 10 m. Further, the imaging conditions are set such that the point FOE at infinity comes to a point at two thirds from the bottom line on a central line of the input image.

The capacity of the analog to digital conversion section 12 is set arbitrarily so that quantization may be performed within the range of 4 to 8 bits depending upon a necessary resolution. Meanwhile, the frame memories $M_1$ and $M_2$ particularly have a configuration as shown in FIG. 3 and are each constructed to store, corresponding to an input image, n quantized data Xn in the direction of an X-axis (horizontal axis) and k quantized data $Y_k$ in the direction of a Y-axis (vertical axis). The capacity n×k is set arbitrarily within the range of 64 to 512 bytes (=n, k) depending upon the necessary resolution, similar to the analog to digital conversion section 12. In the configuration shown in FIG. 3, n and k of the frame memories $M_1$ and $M_2$ are both set to 256 bytes.

A Y direction comparator 14y successively compares, for the individual columns of the frame memories $M_1$ and $M_2$ in which quantized data are stored, the quantized data at the same sample points with each other from the column $Y_1$ to the column $Y_k$ (256) to calculate and output differences of the quantized data representative of density values as density value differences.

An averaging memory 15y includes m memories $X_1$ to $X_m$ each having a capacity of n×k similar to the frame memories $M_1$ and $M_2$ and stores density value difference data between the same sample points of two frames output from the Y direction comparator 14y.

An X-axis counter 16y includes n counters each of which is provided for a column and counts the density value difference data stored in the m memories $X_1$ to $X_m$ of the averaging memory 15y in the direction of the column and holds the count value. Consequently, the X-axis counter 16y holds n accumulated values obtained by averaging the density value differences in the Y direction. Accordingly, average variation values of the accumulated values of the density value differences in the Y-axis direction can be known from the stored contents of the X-axis counter 16y. The contents of the X-axis counter 16y are output serially from the X-axis counter 16y.

An X direction comparator 14x successively compares, for the individual rows of the frame memories $M_1$ and $M_2$ in which quantized data are stored, the quantized data at the same sample points with each other from the row $Y_1$ to the row $Y_k$ (256) to calculate and output differences of the quantized data representative of density values as density value differences.

An averaging memory 15x includes m memories $Y_1$ to $Y_m$ each having the capacity of n×k similar to the frame memories $M_1$ and $M_2$ and stores density value difference data between the same sample points of two frames output from the X direction comparator 14x.

A Y-axis counter 16x includes n counters each of which is provided for a row and counts the density value difference data stored in the m memories $Y_1$ to $Y_m$ of the averaging memory 15x in the direction of the row and holds the count value. Consequently, the Y-axis counter 16x holds k accumulated values obtained by averaging the density value differences in the X direction. Accordingly, average variation values of the accumulated values of the density value differences in the Y-axis direction can be known from the stored contents of the Y-axis counter 16x. The contents of the Y-axis counter 16x are output serially from the Y-axis counter 16x.

The Y direction comparator 14y and the X direction comparator 14x constitute the comparison means 2 described hereinabove with reference to FIG. 1, and the X-axis counter 16y and the Y-axis counter 16x constitute the column accumulation means 3 and the row accumulation means 4, respectively.

A window setting unit 17 is interposed between the storage apparatus 13 and the X direction comparator 14x and sets, under the control of a processing circuit 18 which will be described below, a range of quantized data in the frame memories $M_1$ and $M_2$ to be compared by the X direction comparator 14x.

The processing circuit 18 receives average variation values in the Y direction and the X direction output from the X-axis counter 16y and the Y-axis counter 16x, respectively. The processing circuit 18 then processes the inputted average variation values in the X direction to detect a vehicle width D of the preceding vehicle, that is the vehicle in front of a vehicle that incorporates the distance measuring apparatus, based upon the number of pixels along the X axis within a portion or frequency range within which the variation in density difference is at a minimum as seen from FIG. 2b to track the preceding vehicle.

Further, the processing circuit 18 processes the input average variation values in the X direction to control the window setting unit 17 to set a window corresponding to the vehicle width D of the vehicle in front being tracked. Furthermore, the processing circuit 18 processes the inputted average variation values in the Y direction to detect the position at which the frequency of the density variations exhibits a sudden variation as seen in FIG. 2c to measure the distance to the vehicle and output a vehicle in front distance signal.

Thus, the processing circuit 18 serves as the chasing means 5 including the vehicle width detection means 51 and also as the distance measurement means 6 described above with reference to FIG. 1.

The distance measuring apparatus further includes a ROM (read only memory) 19 as a corrected value storage apparatus in which a table for correction values to be used in processing by the processing circuit 18 is stored. The ROM 19 constitutes the table storage means 61 described with reference to FIG. 1.

In operation, the CCD camera 11 images a foreground from the vehicle incorporating the distance tracking device which is travelling on a travelling road, and fetches the foreground image as an image signal. The analog image signal output from the CCD camera 11 is converted into a digital signal and then quantized by the analog to digital conversion section 12. The quantized data for one frame obtained from the analog to digital conversion section 12 are stored in one of the frame memories $M_1$ and $M_2$ of the storage apparatus 13, for example, into the frame memory $M_1$.

After a fixed time $\Delta t$ which is commonly about 30 milliseconds although it can be set arbitrarily, the analog image signal of the foreground imaged by the CCD camera 11 is inputted, and the quantized data for one frame obtained from the analog image signal are stored into the other frame memory $M_2$ of the storage apparatus 13. The alternate storage of quantized data for one frame into the frame memories $M_1$ and $M_2$ is controlled by a system controller not shown.

After the quantized density value data for one frame are stored into each of the frame memories $M_1$ and $M_2$ in order to individually compare the columns and the rows of the frame memories $M_1$ and $M_2$, the quantized data at the same sample points of the frame memories $M_1$ and $M_2$ are read out in the Y- and X-axis directions and inputted to the Y direction comparator 14y and the X direction comparator 14x, respectively, under the control of the system controller not shown.

Figure 4:
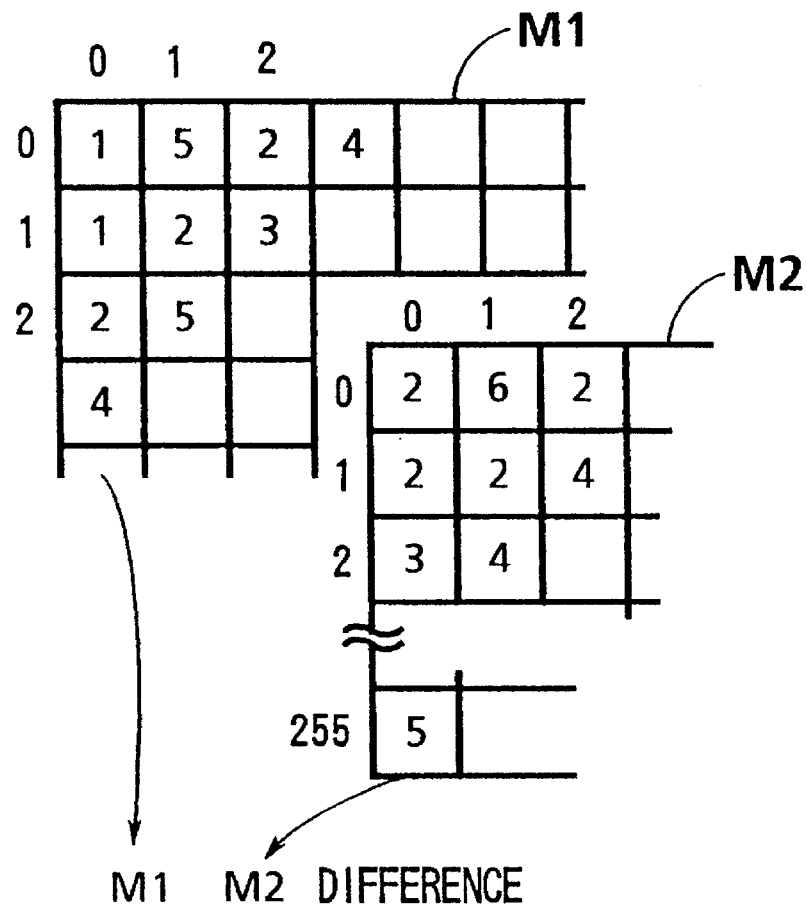

Exemplary comparison of the quantized data in the first column (column 0) of the frame memories $M_1$ and $M_2$ will be described in detail with reference to FIG. 4. First, "1" in the first row in the first column of the frame memory $M_1$ and "2" in the first row in the first column of the frame memory $M_2$ are compared with each other, and the difference "1" between them is written into the memory $X_1$ of the averaging memory 15y. Subsequently, "1" in the second row in the frame memory $M_1$ and in the second row in the frame memory $M_2$ are compared with each other, and the difference "1" between them is written into the same averaging memory $X_1$. Thereafter, "2" and "3", . . . . , and "8" and "5" are successively compared with each other, and the differences "1", . . . . , and "3" are successively written into the memory $X_1$. The same sequence of operations is performed successively for the remaining columns 1 to 255. Similar processing is performed also for the rows 0 to 255, thereby completing processing for one frame. The processing for one frame is completed within the time of 30 milliseconds mentioned hereinabove.

After completion of the processing for one frame, quantized data for a next one frame are stored into the frame memory $M_1$ in place of the preceding quantized data, and after completion of storage of data for the second one frame, the processing of calculating the differences at the same sample points by comparison between the quantized data described above is performed.

Now, where the averaging memories 15y and 15x include three memories $X_1$ to $X_3$ and three memories $Y_1$ to $Y_3$, respectively, accumulated values in the columns and the rows of the memories are calculated by means of the X-axis counter 16y and the Y-axis counter 16x, and then the accumulated values of the three memories in each direction are added. The sum values thus obtained are held in the X-axis counter 16y and the Y-axis counter 16x. The averaging memories 15y and 15x are provided in order to prevent a possible influence of disturbances such as direct light.

Figure 6:
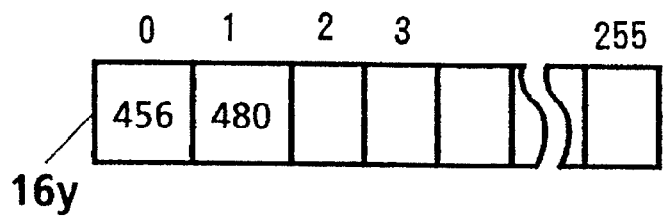

While it is described above that, in the distance measuring apparatus of the embodiment shown in FIG. 2a, the memories $X_1$ to $X_3$ and $Y_1$ to $Y_3$ of the averaging memories 15y and 15x have an equal capacity to that of the frame memories $M_1$ and $M_2$, if the outputs of the comparators 14y and 14x are individually added and stored, then the memories $X_1$ to $X_3$ can be replaced with memories having the capacity of n×1 as shown in FIG. 5, and similarly, also the memories $Y_1$ to $Y_3$ can be replaced with memories having the capacity of 1×k. Then, values obtained by simple averaging of the accumulated values of the memories $X_1$ to $X_3$ may be stored into the Y-axis counter 16y as shown in FIG. 6.

Further, it is also possible to detect the values of the averaging memories 15y and 15x to detect a sudden signal value variation such as an oscillation of the vehicle to cancel the data of the frame.

Figure 7A:
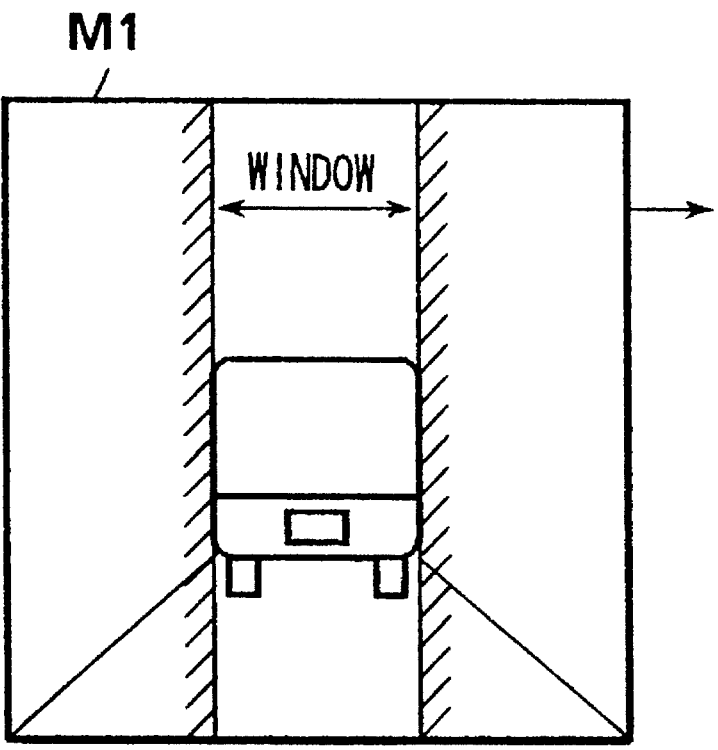
Figure 7B:
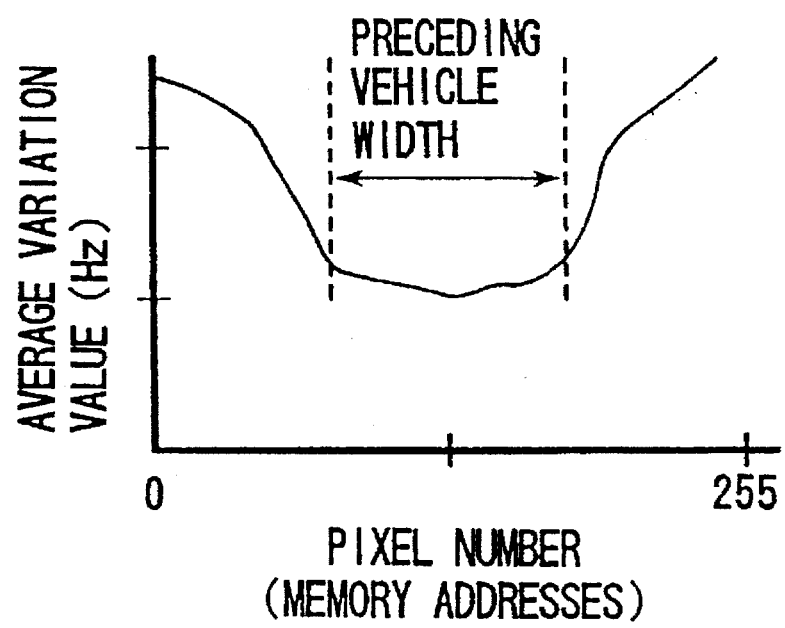

Since the output of the X-axis counter 16y in the imaging range of the vehicle in front makes a portion which exhibits a small variation in density value as can be seen from FIG. 7 in which the output of the X-axis counter 16y is shown corresponding to the input image, the vehicle width of the preceding vehicle, that is the width of a vehicle traveling in front of a vehicle that incorporates the distance measuring apparatus, can be determined from the data values along the horizontal (X-) axis while determination of the travelling direction of the vehicle in front and consequently chasing of the preceding vehicle can be performed from the number of pixels (memory addresses).

Consequently, while a conventional distance measurement apparatus cannot identify a vehicle width of a vehicle traveling in front of a vehicle that incorporates the distance measurement apparatus, when the vehicle in front moves very frequently such as when the vehicle in front travels along a curve since too much time is required for such processing. The distance measuring apparatus of the present embodiment, such vehicle width can be identified readily by a frequency analysis of the column memory. Meanwhile, the width and the position in the horizontal direction of the window are varied by the distance to the vehicle in front or a curved travelling road, and accordingly, the vehicle in front can be tracked automatically in accordance with the values of the X-axis counter.

The vehicle in front which is travelling at a substantially equal velocity to that of the vehicle incorporating the distance measurement apparatus little variation in the output of the X-axis counter 16y since it has a velocity substantially equal to zero relative to the vehicle following, and a minimum level of the average variation values represents the vehicle in front. Thus, the window should be provided at memory addresses corresponding to the width of the vehicle, and quantized data in the window should be output and compared by the X direction comparator 14x.

Where the window is provided in such a manner as described above, only data in the window must be processed in row processing, and consequently, the processing rate is increased. Meanwhile, when the distance to the vehicle in front is very great or the vehicle in front moves to the left or right end of the screen at a curve of the travelling road in tracking the vehicle, noise components are reduced significantly and the output signal of the Y-axis counter is stabilized.

Figure 8:
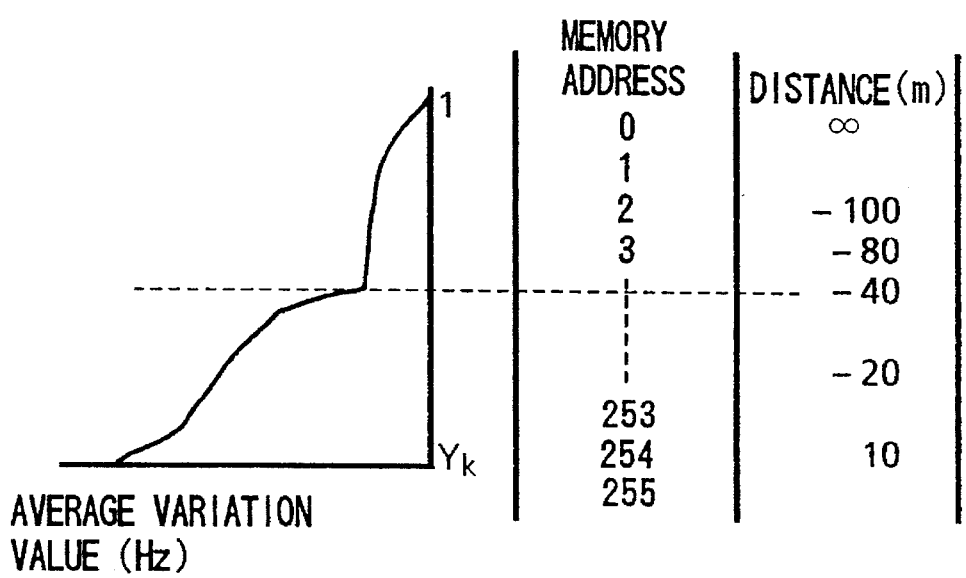
Figure 9:
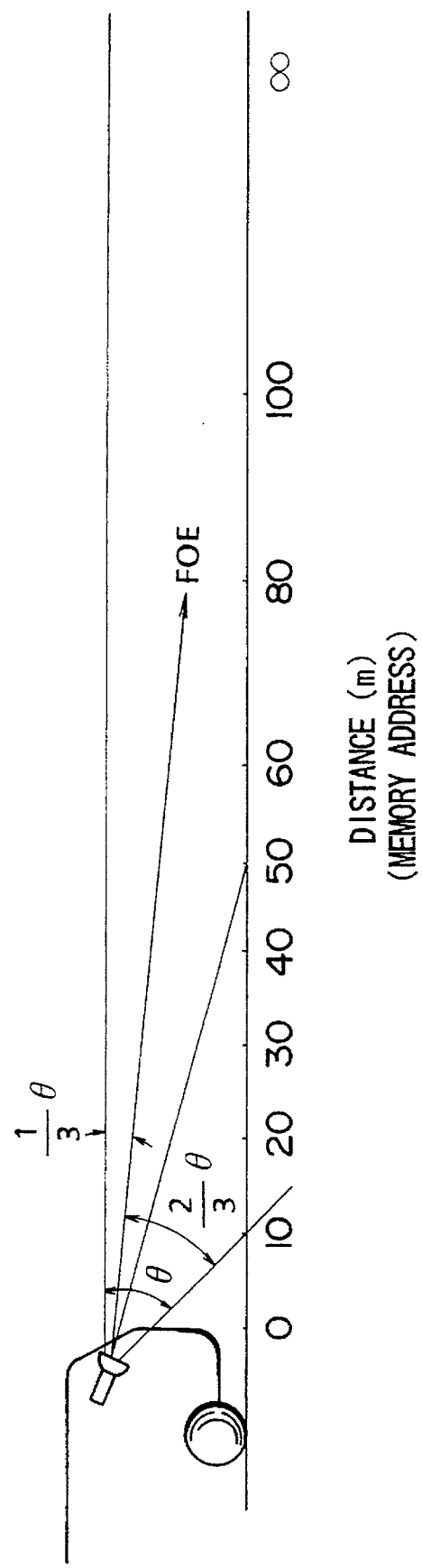
FIG. 9 is a diagrammatic view illustrating the principle of measurement illustrated in FIG. 8.

The output of the Y-axis counter 16x can be utilized to measure the distance to the vehicle in front as seen from FIGS. 8 and 9. In particular, referring to FIGS. 8 and 9, the addresses of the Y-axis counter 16x and the optical distances are set in advance, and since the point at which a sudden variation appears with the variation value data is the position of the vehicle in front, the distance to the preceding vehicle can be measured from the point. In FIG. 8, the address 256 is set to 10 m.

For the object of the operation described above, the processing circuit 18 calculates the position of and the distance to the vehicle in front from the outputs of the X-axis counter 16y and the Y-axis counter 16x and performs logical processing for necessary determination using the correction value table stored in the ROM 19.

In the distance measuring apparatus of the embodiment described above, it is only necessary to prepare a memory of the capacity of about 100 kilobytes, which is less than one tenth the memory capacity required for image processing by conventional distance measuring apparatus, and a distance measuring instrument by which real time processing of about 30 milliseconds can be constructed.

Figure 10:
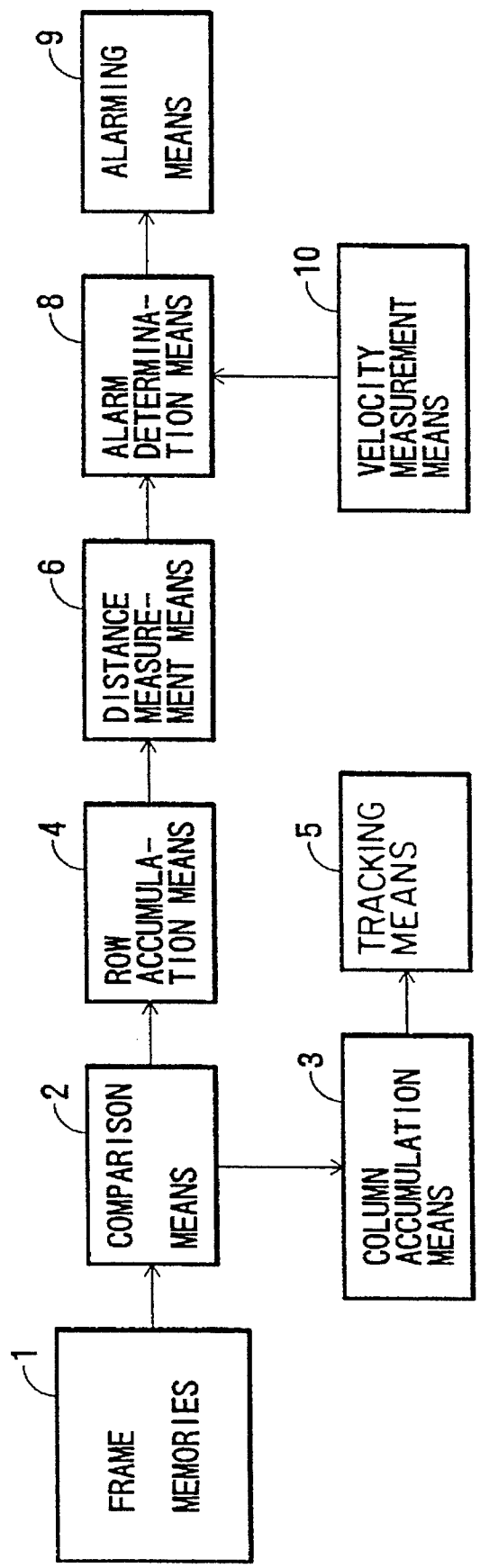
FIG. 10 is a block diagram showing the basic construction of a rear-end collision preventing alarming apparatus of the target tracking type according to the present invention.

Referring now to FIG. 10, there is shown the basic construction of a rear-end collision preventing alarming apparatus according to the present invention. The rear-end collision preventing alarming apparatus is an application of the distance measuring apparatus of the present invention described above and comprises a plurality of frame memories 1, comparison means 2, column accumulation means 3, row accumulation means 4, tracking means 5, distance measurement means 6, for chasing a preceding vehicle and the velocity measurement means 7 as described above. The rear-end collision preventing apparatus further includes an alarming determination means 8 for determining, based on the measured distance and the measured velocity whether or not an alarm for preventing a rear-end collision should be set off, and alarming means 9 for generating an alarm in response to a determination of the alarming determination means 9.

While the distance measuring apparatus incorporated in the rear-end collision preventing alarming apparatus shown in FIG. 10 may be the same as the distance measuring apparatus described hereinabove with reference to FIG. 1, it is shown different in that it includes only the principal components of the distance measuring apparatus and does not include the window setting means 7 and the tracking means 5 does not include the vehicle width detecting means 51, while the distance measurement means 6 does not include the table storage means 61. In addition to the principal components of the distance measuring apparatus, the rear-end collision preventing alarming apparatus includes the velocity measurement means 7, the alarming determination means 8 and the alarming means 9.

In the rear-end collision preventing alarming apparatus described above, the components of the distance measuring apparatus incorporated therein operate similarly to those of the distance measuring apparatus of FIG. 1, and overlapping description thereof is omitted herein to avoid redundancy.

Since it is experimentally known that it is necessary to keep a greater distance to a preceding vehicle as the velocity of vehicle incorporating the rear-end collision preventing alarming apparatus increases in order to assure safe driving and the range for alarming can be set in advance based on the relationship between the velocity of the vehicle and the distance to the vehicle in front. The alarming determination means 8 determines, in accordance with the distance to the vehicle in front measured by the distance measurement means 6 and the velocity measured by the velocity measurement means 7, whether or not an alarm for preventing a rear-end collision should be set off. The alarming means 9 sets an alarm in accordance with a result of the determination of the alarming determination means 8.

Accordingly, the rear-end collision preventing alarming apparatus can track the vehicle in front and measure the distance to the vehicle in front and set an alarm to avoid the possibility of a rear-end collision without employing a memory having a large capacity.

Referring now to FIG. 11a, there is shown a rear-end collision preventing alarming apparatus to which the present invention is applied. The rear-end collision preventing alarming apparatus shown includes a CCD camera 11 including an optical system 11a and a CCD image sensor 11b for serving as the imaging means, an analog to digital (A/D) conversion 12, a storage apparatus 13 including a pair of frame memories $M_1$ and $M_2$ and constituting the frame memories 1 of FIG. 10, a Y direction comparator 14y, an averaging memory 15y including m memories $X_1$ to $X_m$, an X-axis counter 16y, an X direction comparator 14x, an averaging memory 15x including m memories $Y_1$ to $Y_m$, a Y-axis counter 16x including n counters, a processing circuit 18, and a ROM 19, which are all similar in construction and operate in a similar manner to those of the distance measuring apparatus described hereinabove with reference to FIG. 2a. Thus, overlapping description of the common components will be omitted herein to avoid redundancy.

The Y direction comparator 14y and the X direction comparator 14x constitute the comparison means 2 described with reference to FIG. 10, and the X-axis counter 16y and the Y-axis counter 16x constitute the column accumulation means 3 and the row accumulation means 4, respectively. Further, the processing circuit 18 serves as the tracking means 5 and also as the distance measurement means 6.

The rear-end collision preventing alarming apparatus further includes a speedometer 22 serving as the velocity measurement means 7 for measuring the velocity of the vehicle incorporating the device. The speedometer 22 processes distance pulses, which are generated, for example, from a rotation sensor not shown which is driven by rotation of a wheel not shown connected to a transmission not shown of the automobile, to measure the velocity of the vehicle to output a velocity signal.

An alarming processing circuit 20, serving as the alarming determination means 8, receives a preceding vehicle distance signal output from the processing circuit 18 and a velocity signal output from the speedometer 22 and determines, from the input signals, whether or not an alarm for preventing a rear-end collision should be set. When the alarming processing circuit 20 determines that an alarm should be set off, it outputs an alarming signal. Although details are hereinafter described, the alarming processing circuit 20 executes alarming processing which outputs two kinds of alarming signals including an attention alarm and an emergency alarm.

An alarm 21 in the form of a buzzer serving as the alarming means 9 operates in response to an alarming signal output from the alarming processing circuit 20 to generate an alarming sound. In this instance, the alarm 21 generates one of several different alarming sounds in response to the kind of the alarming signal so that an attention alarm or an emergency alarm can be identified by an operator.

In operation, the common components of the rear-end collision preventing alarming apparatus to those of the distance measuring apparatus described hereinabove with reference to FIG. 2 operate similarly as described above.

The alarming processing circuit 20 inputs a preceding vehicle distance signal outputted from the processing circuit 18 and a velocity signal outputted from the speedometer 22 and determines, from the thus inputted signals, whether or not an alarm should be set off. In order to perform such determination, the alarming processing circuit 20 has determination data stored in advance therein which indicate an attention alarm range and an emergency alarm range based on the relationship between the velocity of the vehicle and the distance to a vehicle in front as seen from FIG. 12. When it is determined that the attention alarm range is entered, the alarming processing circuit 20 outputs an attention alarm signal, but when it determines that the emergency alarm range is entered, it outputs an emergency alarm signal to the alarm 21.

The alarm 21 selectively outputs, in response to an input of an attention alarm signal or an emergency alarm signal thereto, an alarming sound in such a manner that it can be discriminated between the attention alarm signal and the emergency alarm signal, thereby to call an attention of the driver or inform the driver of an emergency.

In the rear-end collision preventing alarming apparatus of the embodiment described above, it is only necessary to prepare a memory of the capacity of about 100 kilobytes, which is less than one tenth the memory capacity required for image processing by conventional distance measuring apparatus, and real time processing of about 30 milliseconds can be achieved.

Having now fully described the invention, it will be apparent to one of ordinary skill in the art that many changes and modifications can be made thereto without departing from the spirit and scope of the invention as set forth herein.

What is claimed is:

1. A distance measuring apparatus for incorporation in a first vehicle, comprising:
   a plurality of frame memories for receiving quantized density date of an image in successive image frames obtained at fixed intervals of time by imaging a road along which said first vehicle is travelling and for selectively storing the received quantized density data in a matrix of columns and rows;
   comparison means for determining a difference between the quantized density data stored in said frame memories at corresponding coordinate points and for outputting density difference data;
   column accumulation means for accumulating the density difference data output by said comparison means for each of the columns;
   row accumulation means for accumulating the density difference data output by said comparison means for each of the rows;
   tracking means for tracking a second vehicle travelling on said read along a path in front of said first vehicle in accordance with an output of said column accumulation means; and
   distance measurement means for measuring the distance between the first and second vehicles in accordance with an output of said row accumulation means.

2. A distance measuring apparatus as claimed in claim 1, wherein said tracking means includes vehicle width detection means for detecting the width of the second vehicle, by determining a range over which the accumulated values accumulated by said column accumulation means are steady and at a minimum.

3. A distance measuring apparatus as claimed in claim 2, further comprising window setting means for setting, in accordance with the detected width of the second vehicle, a window representing a range of quantized density data for comparison by said comparison means.

4. A distance measuring apparatus as claimed in claim 1, wherein said distance measurement means includes table storage means for storing a table of distance values corresponding to the output of said row accumulation means, and for measuring the distance between the first and second vehicles by referring to said data table in accordance with position at which the accumulated values accumulated by said row accumulation means exhibit a sudden variation.

5. An alarm apparatus incorporated in a first vehicle for preventing a rear-end collision with a second vehicle, comprising:
   a plurality of frame memories for receiving quantized density data of an image in successive image frames obtained at fixed intervals of time by imaging a road along which said first vehicle is travelling and for selectively storing the received quantized density data in a matrix of columns and rows;
   comparison means for determining a difference between the quantized density data stored in said frame memories at corresponding coordinate points and for outputting density difference data;
   column accumulation means for accumulating the density difference data output by said comparison means for each of the columns;
   row accumulation means for accumulating the density difference data output by said comparison means for each of the rows;
   tracking means for tracking said second vehicle travelling on said road along a path in front of said first vehicle in accordance with an output of said column accumulation means;
   distance measurement means for measuring the distance between the first and second vehicles in accordance with an output of said row accumulation means;
   velocity measurement means for measuring a velocity of the first vehicle;
   alarm determination means for determining, from the measured distance and the measured velocity, whether to set an alarm for preventing a collision between said first and second vehicles; and
   alarming means for generating an alarm when said alarm determination means determines that an alarm should be set.

6. An alarm apparatus for preventing a rear-end collision as claimed in claim 5, wherein said alarm determination means outputs, in response to the measured distance and the measured velocity, a first signal or second signal representative of degrees of probability of a collision between the first and second vehicles, and said alarming means outputs a different alarming sound in response to the first or second signals from said alarm determination means.

* * * * *